Dec. 4, 1956
L. S. CORCORAN
2,772,629
SHELL LOADING PRESS
Filed Feb. 25, 1954
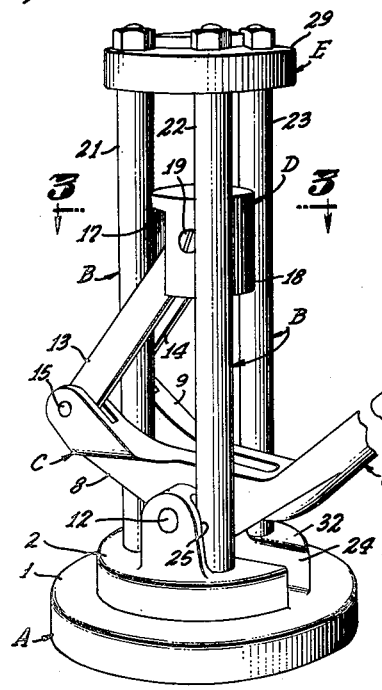
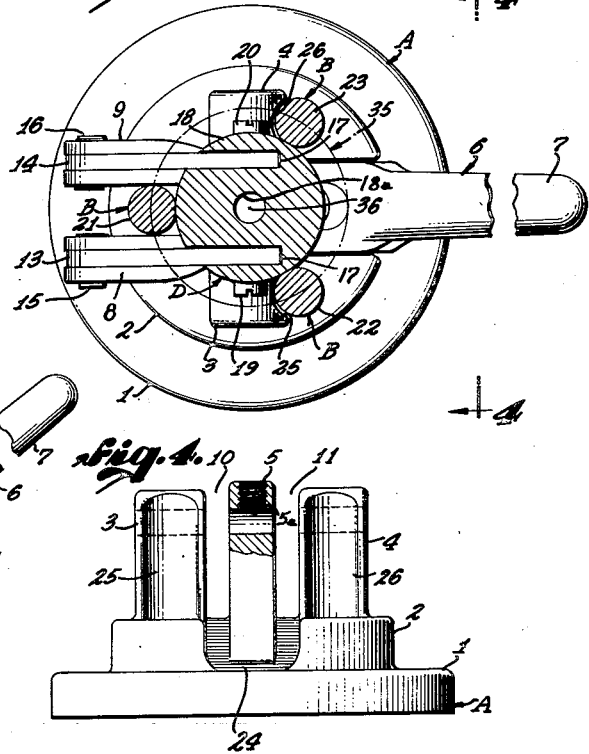
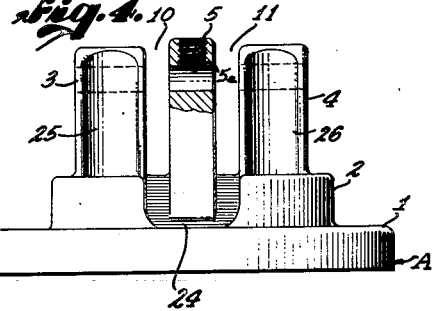
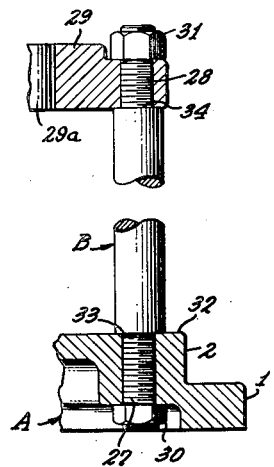
LYLE S. CORCORAN,
INVENTOR.
BY *Lynn W. Latta*
ATTORNEY.

United States Patent Office 2,772,629
Patented Dec. 4, 1956

2,772,629

SHELL LOADING PRESS

Lyle S. Corcoran, Hollywood, Calif.

Application February 25, 1954, Serial No. 412,476

1 Claim. (Cl. 100—283)

The invention relates to a hand press of the type particularly useful in the art of reloading rifle or shot gun shells or in the art of swaging bullets. The press may also be utilized in any art where the piece to be operated upon is mounted concentrically with the actuating head of the press. The invention embodies structural features which are conducive to accuracy for precision shell reloading operations as well as possessing sufficient rigidity and strength for performing bullet swaging operations.

The construction of the press is such that the various dies which may be used therewith align themselves automatically with reference to the operating head of the press.

One object of the invention is to provide a hand press having guide rods which automatically align the operating head for movement in a rectilinear path relative to the guide rods.

Another object of the invention is to provide a hand press having three or more cylindrical guide rods within which a cylindrical operating head is guided by surface contact between the external walls of the cylindrical guide rods and the operating head.

Another object of the invention is to provide a hand press having a rigid supporting base and three cylindrical guide rods projecting vertically therefrom in parallel fashion to each other, said rods automatically concentrically guiding a cylindrical head for rectilinear movement within their confines, the axes of said rods lying in a common circular path which is generated from the axis of the cylindrical head.

Another object of the invention is to provide a hand press having a rigid base with three cylindrical guide rods fixed thereto and projecting vertically therefrom in parallel alignment with each other, the upper ends of said rods being anchored to a die holding plate, which plate has means for positioning of dies thereonto in concentric alignment relative to the axis of a circle drawn through the axes of the guide rods.

A further object of the invention is to provide a hand press having a rigid supporting base and guide rods projecting therefrom with an operating head guided by the guide rods, said head being actuated by a novel linkage and lever assembly which is fulcrummed on the supporting base.

Other objects and advantages of the invention will become apparent from the ensuing specifications and appended drawings in which:

Fig. 1 is a perspective view of the press;

Fig. 2 shows a partial section through a portion of the cap and a portion of the base and illustrates the manner in which a tie rod is connected to each;

Fig. 3 is a sectional view taken on the line 3—3 of Fig. 1; and

Fig. 4 is a detail view of the base of the press per se taken on the line 4—4 of Fig. 3.

In general the press comprises a base A, guide rods B, an actuating lever assembly C, a working head D and a supporting cap E at the upper end of the guide rods.

The base A may be in the form of a casting having a circular pedestal portion 1 and an upwardly extending generally circular boss portion 2 of smaller diameter than the pedestal portion. A pair of lugs 3 and 4 which are integral with the boss 2 project upwardly therefrom and a third lug 5 integral with boss 2 projects upwardly into the open area between lugs 3 and 4.

A bell crank lever, generally designated by the numeral 6, has an elongated hand gripping portion 7 and has bifurcated legs 8 and 9 at the end opposite the hand gripping portion. The legs 8 and 9 are received in a pair of channels 10 and 11 which are formed between the upwardly projecting lugs 3, 4 and 5. A pivot pin 12 extends through registered apertures in the lugs 3, 4 and 5 and corresponding apertures in the legs 8 and 9 of the bell crank lever and serves as the fulcrum for the lever. Each leg 8 and 9 is in turn bifurcated at its free end to receive the links 13 and 14. The links are pivotally connected to the ends of the legs 8 and 9 by means of the pivot pins 15 and 16. The opposite ends of the links 13 and 14 are received within a pair of slots 17 in the head 18 and said links are pivotally connected to the head 18 by means of the pivot pins 19 and 20.

The lever 6 may be in the form of a casting or forging. The outer ends of the legs 8 and 9 extend on opposite sides of one of the guide rods 21 and the inner ends of the legs 8 and 9 extend between the remaining guide rods 22 and 23.

There is some side thrust imposed upon the head 18 due to the links 13 and 14 acting thereupon in an inclined direction, that is inclined relative to the vertical path of movement of the head. This side thrust imposed upon the plunger is resisted by two of the three guide rods, namely, guide rod 22 and guide rod 23. The particular construction of the bell crank lever and the actuating links 13 and 14 make it possible to have the inner guide rods 22 and 23 absorb this side thrust.

A mouth 24 is formed in the boss 2 in front of the lug 5 to permit the adjacent portion of the bell crank lever 6 to be lowered thereinto so as to increase the overall downward stroke of the handle and the upward stroke of the head 18. The inner faces of the lugs 3 and 4 are preferably recessed at 25 and 26 to accommodate the lower ends of the guide rods 22 and 23.

Each of the guide rods may be provided with externally threaded end portions 27 and 28 (see Fig. 2) which are inserted through appropriate apertures in the base A and in the cap 29, said rods being anchored to the base and to the cap by means of the nuts 30 and 31. When the base A is resting on a horizontal surface, the upper surface 32 of boss 2 likewise lies in a horizontal plane and the annular shoulders 33 and 34 formed on the guide rods at the base of the threaded shank portions 27 and 28 are preferably accurately machined so that when the lower ends of the guide rods are anchored to the base A, each of said guide rods will project upwardly from the base in substantially a true vertical direction, whereupon each guide rod projects upwardly throughout its entire length in a direction in which its axis is parallel with the axis of each of the remaining guide rods. The apertures which accommodate the guide rods in the base as well as the apertures which accommodate the other ends of the guide rods in the cap 29 are carefully drilled so that they are equidistantly spaced from each other and so that the axes of the guide rods fall in a circular path (indicated schematically by dotted lines in Fig. 3, and referred to by the numeral 35) which circular path is generated from the axis 36 of the head 18. The guide rods are preferably circular in section so as to present symmetrical bearing surfaces throughout their entire height, which bearing surfaces are equidistantly spaced from the axis 36 of the head 18.

The operating head 18 is preferably of cylindrical form so that the external cylindrical wall thereof has only straight line contact with the cylindrical external walls of the guide rods. The diameter of the head is such as to permit free sliding movement of the head within the guide rods. The axis 36 of the head is determined automatically by the positioning of the head between the guide rods (as best shown in Fig. 3). By providing the head and the guide rods with cylindrical walls, the required concentricity of the head relative to the axis of the cap E may be readily maintained. Likewise when there has been any wear on the guide rods from prolonged periods of use of the press, then the guide rods can be loosened and turned slightly about their axes, thereby presenting new bearing surfaces to the head.

The head 18 has an axial bore 18a therethrough which is concentric with an axial bore 29a in the cap 29 for accommodating in concentric alignment the dies, tools or other parts which are being fabricated or otherwise utilized in the press. The lug 5 may also be provided with an internally threaded bore 5a which is concentrically aligned with the bores in the head and cap and which may be utilized for accommodating a tool, die or other part to be operated upon by the downward stroke of the head.

While the form of the invention as shown in Figs. 1, 2, 3, and 4 is the preferred form of the invention and the least expensive to manufacture, however, it will be understood that modified forms of the invention can be used.

I claim:

A hand operated tool for reloading ammunition shells comprising: a head; a base; three cylindrical guide rods securely anchored in said base and projecting upwardly therefrom; said guide rods being equidistantly spaced circumferentially and at a common radius from and parallel to a major axis of the press, said rods each having reduced externally threaded end portions at both ends thereof and having shoulders at the bases of said threaded portions; said head and base each having three bores through which said respective reduced threaded portions of the guide rods project; nuts threaded on said threaded portions and clamping said head and base against said shoulders; a plunger caged within the guide rods and having a cylindrical external surface bearing against all three of said guide rods in tangent relation to the surfaces of the guide rods, said plunger having therein a pair of slots; a pair of parallel flat bar links having their upper ends received in said slots and pivotally connected to said plunger on an axis extending diametrically thereof; a bell crank lever including a handle portion at one end and a bifurcated lever portion at its other end, said bell crank being pivotally connected to said base on an axis disposed diametrically thereof and parallel to said axis of pivotal connection of the links to the plunger, said bifurcated lever portion including respective furcations spaced laterally, straddling one of said guide rods; and pivots connecting the lower ends of the respective links to the outer ends of the respective furcations; said links closely embracing said one guide rod; said bell crank being operative to move said plunger upwardly when the handle is moved downwardly; said plunger being in the form of a solid metal cylinder having a central bore in which a shell reloading tool may be positioned.

References Cited in the file of this patent

UNITED STATES PATENTS

| | | |
|---|---|---|
| 953,173 | Marsh | Mar. 29, 1910 |
| 1,665,403 | Caps | Apr. 10, 1928 |
| 2,395,494 | Mosher | Feb. 26, 1946 |

OTHER REFERENCES

American Rifleman Magazine, page 60 of the December 1952 issue, also page 51 of the December 1953 issue. Published by the National Rifle Association of America, at 1600 Rhode Island Ave., N. W., Washington 6, D. C.